(12) United States Patent
Brown et al.

(10) Patent No.: US 11,758,119 B2
(45) Date of Patent: Sep. 12, 2023

(54) LOW COST HUD USING STEREO AND HEAD TRACKING

(71) Applicant: Rockwell Collins, Inc., Cedar Rapids, IA (US)

(72) Inventors: Robert D. Brown, Lake Oswego, OR (US); Ian J. Bull, Portland, OR (US); Tracy J. Barnidge, Marion, IA (US); Daniel J. Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/579,008

(22) Filed: Jan. 19, 2022

(65) Prior Publication Data

US 2023/0231987 A1 Jul. 20, 2023

(51) Int. Cl.
*H04N 13/383* (2018.01)
*H04N 13/332* (2018.01)
*H04N 13/106* (2018.01)
*G02B 27/01* (2006.01)

(52) U.S. Cl.
CPC ....... *H04N 13/383* (2018.05); *G02B 27/0101* (2013.01); *G02B 27/0179* (2013.01); *H04N 13/106* (2018.05); *H04N 13/332* (2018.05); *G02B 2027/014* (2013.01); *G02B 2027/0123* (2013.01); *G02B 2027/0134* (2013.01); *G02B 2027/0187* (2013.01)

(58) Field of Classification Search
CPC .. H04N 13/383; H04N 13/306; H04N 13/332; H04N 13/344; G02B 27/0101; G02B 27/0179; G02B 27/017; G02B 2027/0123; G02B 2027/0134; G02B 2027/011
See application file for complete search history.

(56) References Cited

U.S. PATENT DOCUMENTS

| | | | |
|---|---|---|---|
| 5,673,151 A | | 9/1997 | Rallison |
| 5,822,127 A | * | 10/1998 | Chen ................. G02B 27/0172 359/633 |
| 5,991,087 A | * | 11/1999 | Rallison ............ G02B 27/0172 359/630 |
| 9,762,895 B1 | | 9/2017 | Henry et al. |

(Continued)

FOREIGN PATENT DOCUMENTS

| | | | |
|---|---|---|---|
| CN | 112584114 A | * | 3/2021 |
| EP | 2786196 A4 | | 11/2015 |

*Primary Examiner* — Rowina J Cattungal
(74) *Attorney, Agent, or Firm* — Suiter Swantz pc llo

(57) ABSTRACT

A system for displaying a stereo image is disclosed. The system includes a stereoscopic head up display (HUD) that includes a combiner and a display configured to display a stereo image. The system further includes either a head tracking sensor or an eye tracking sensor configured to generate a tracking dataset. The system further includes a processor and a memory with instructions that cause the processor to receive the tracking dataset, generate a distortion map based on the tracking dataset and a distortion function, receive a media stereo image, generate a stereo signal based on the distortion map and the media stereo image, and transmit the stereo signal to the display. The system is capable of conveying an image to an operator in the absence of a relay lens.

13 Claims, 11 Drawing Sheets

(56) References Cited

U.S. PATENT DOCUMENTS

| | | |
|---|---|---|
| 10,238,279 B2 | 3/2019 | Izatt et al. |
| 10,931,938 B2 | 2/2021 | Hulsey et al. |
| 2015/0022887 A1 | 1/2015 | Larson et al. |
| 2015/0092083 A1* | 4/2015 | Lam .................. G02B 27/0101 348/234 |

* cited by examiner

| #Azimuth | Elevation | X_coord | Y_coord |
|---|---|---|---|
| -15.000000 | 8.000000 | -3.994056 | 1.588935 |
| -15.000000 | 7.000000 | -3.984643 | 1.354747 |
| -15.000000 | 6.000000 | -3.974571 | 1.119822 |
| -15.000000 | 5.000000 | -3.963841 | 0.884172 |
| -15.000000 | 4.000000 | -3.952455 | 0.647812 |
| ⋮ | ⋮ | | |

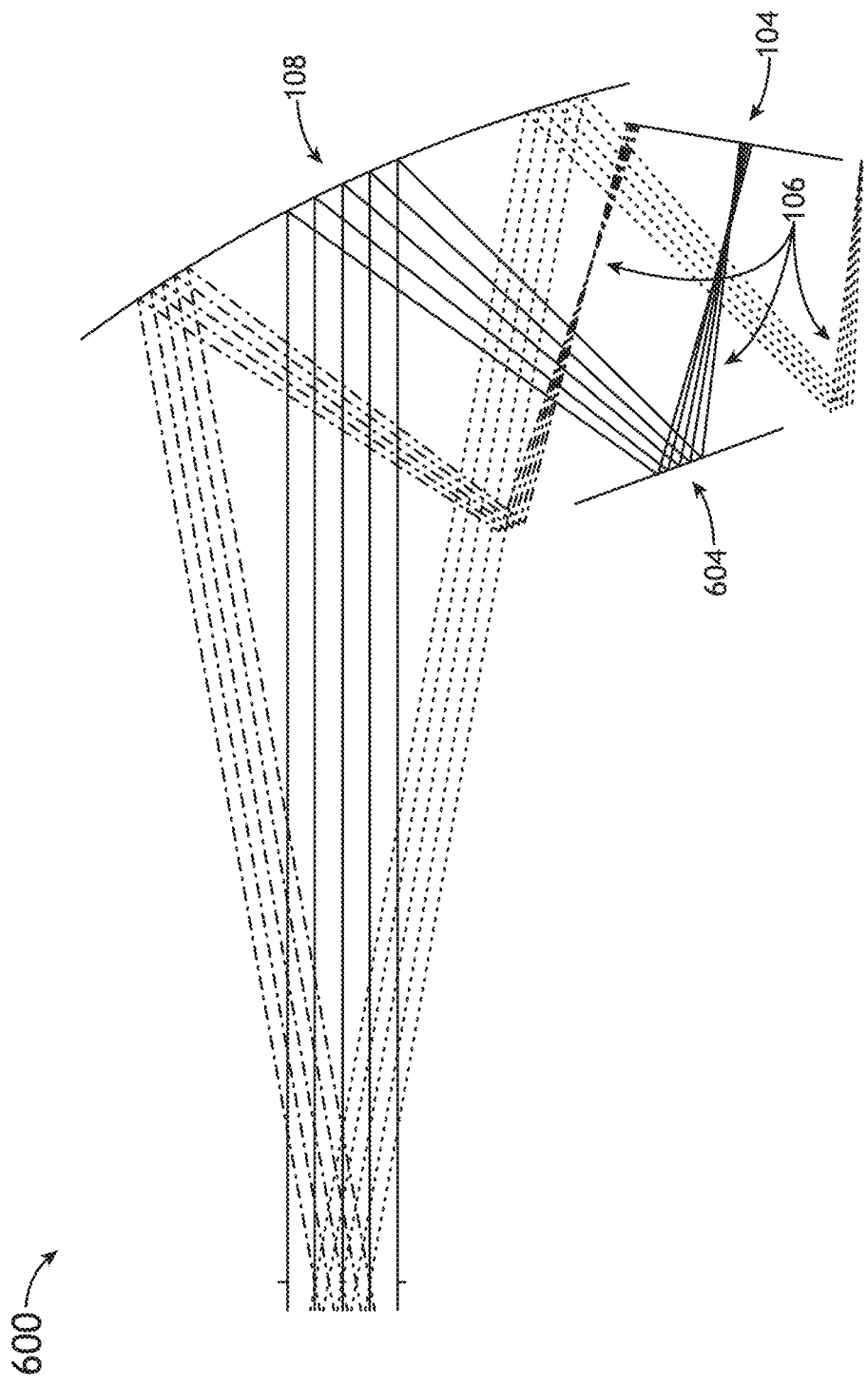

LOW COST HUD USING STEREO AND HEAD TRACKING

BACKGROUND

Conventional head-up displays (HUD) used in aircraft require curved combiners along with heavy and expensive relay lenses to deliver the image from an image source to the combiner. Currently, many aircraft manufacturers concerned with optimizing size, weight and power, along with cost (SWaP-C) see conventional HUDs as too large, heavy and expensive for use. In particular, the relay lenses also take up valuable space within the cockpit. Therefore, it is desirable to provide a system or method that avoids the shortcomings of conventional approaches.

SUMMARY

A system is disclosed. In one or more embodiments, the system includes a stereoscopic head up display (HUD). In one or more embodiments, the stereoscopic HUD includes a combiner and a display configured to display a stereo image. In one or more embodiments, the stereoscopic display further includes at least one of a head tracking sensor or an eye tracking sensor configured to generate and transmit a tracking dataset. In one or more embodiments, the stereoscopic HUD further includes one or more processors communicatively coupled to the display and the at least one the head tracking sensor or eye tracking sensor. In one or more embodiments, the stereoscopic HUD further includes a memory communicatively coupled to the one or more processors with instructions stored thereon. In one or more embodiments, the instructions, upon execution by the one or more processors, causes the one or more processors to receive the tracking dataset. In one or more embodiments, the instructions, upon execution by the one or more processors, causes the one or more processors to generate a distortion map based on the tracking dataset and a distortion function. In one or more embodiments, the instructions, upon execution by the one or more processors, causes the one or more processors to receive a media stereo image signal. In one or more embodiments, the instructions, upon execution by the one or more processors, causes the one or more processors to generate a stereo signal based on the distortion map and the media stereo image. In one or more embodiments, the instructions, upon execution by the one or more processors, causes the one or more processors to transmit the stereo signal to the display.

In some embodiments of the system, the distortion map is generated via a polynomial fitting.

In some embodiments of the system, the distortion map is generated via interpolation.

In some embodiments of the system, the system further comprises eyewear configured to facilitate stereoscopic viewing.

In some embodiments of the system, the display is configured as a liquid crystal display.

In some embodiments of the system, the system does not include a relay lens.

In some embodiments of the system, the system further includes a combiner frame configured to secure the combiner to an aircraft cockpit.

In some embodiments of the system, the system further includes coupling frame configured to mechanically couple the display to the combiner.

In some embodiments of the system, the system further includes a user interface communicatively coupled to the one or more processors.

In some embodiments of the system, the stereoscopic HUD is configured as a glareshield mounted HUD.

In some embodiments of the system, the system, the system further includes one or more fold mirrors configured to increase a field of view.

In some embodiments of the system, at least one of the one or more fold mirrors is steerable.

In some embodiments of the system, the tracking dataset comprises a pair of eye positions.

In some embodiments of the system, the system further includes eyewear recognizable by the tracking sensor, wherein the eyewear is assigned a tracking profile that is used to generate the tracking dataset.

A method is disclosed. In one or more embodiments, the method includes generating a tracking dataset. In one or more embodiments, the method further includes generating a distortion map based on the tracking dataset and a distortion function. In one or more embodiments, the method further includes receiving a media image. In one or more embodiments, the method further includes generating a stereo signal based on the distortion map and the media image. In one or more embodiments, the method further includes transmitting the stereo signal to a display, wherein the display displays the stereo signal as a stereo image.

In some embodiments of the method, generating the tracking dataset includes sensing a position of the eyes of the operator.

In some embodiments of the method, the distortion map is generated via a polynomial fitting.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5A is a table illustrating a representative dataset, in accordance with one or more embodiments of the disclosure;

FIG. 6 is a drawing illustrating a side-view of an optical arrangement, in accordance with one or more embodiments of the disclosure.

DETAILED DESCRIPTION

Figure 1:
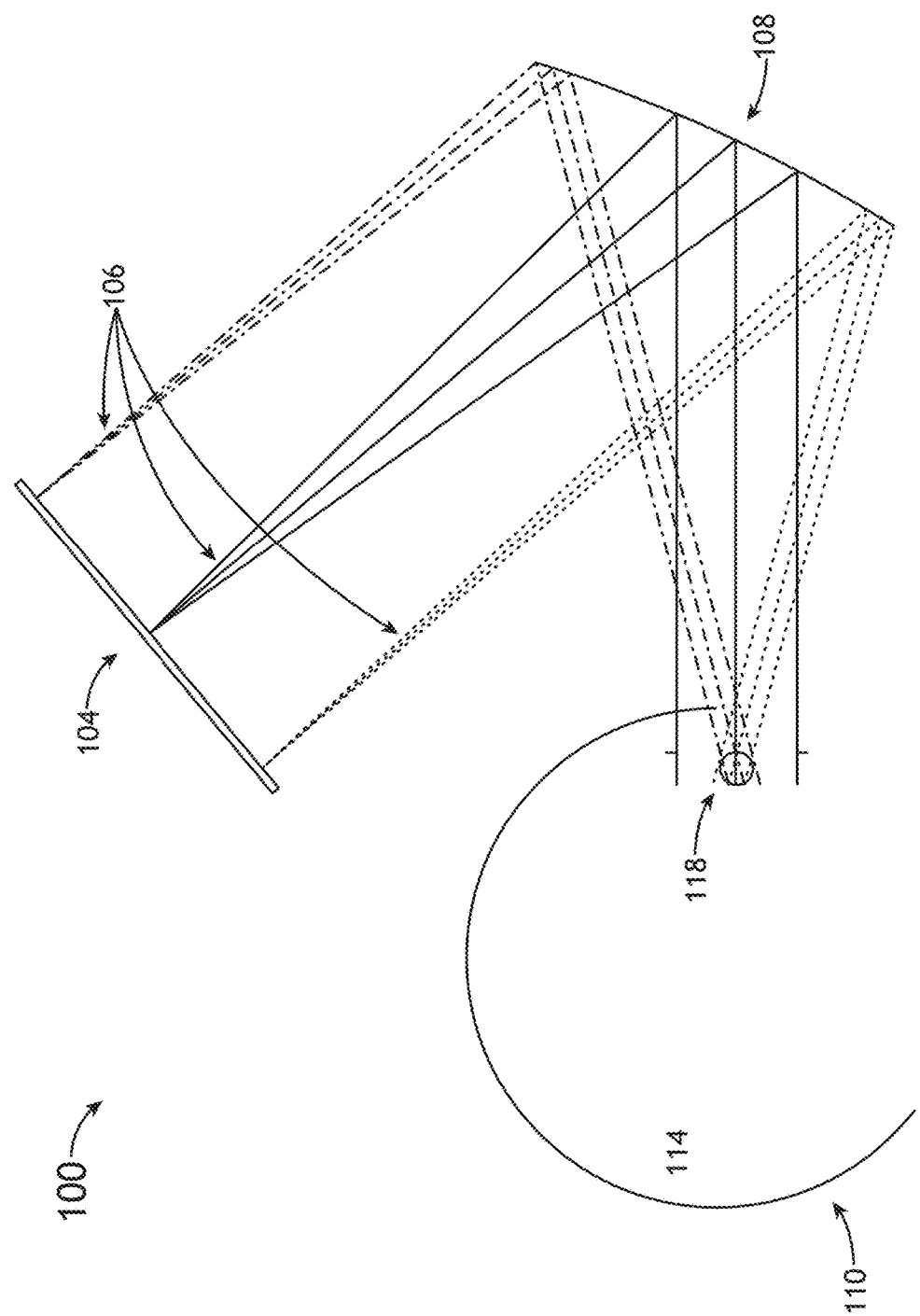
FIG. 1 is a side-view diagram of a system for producing HUD images, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An HUD system that performs without the use of a relay lens is disclosed. The system includes a stereo display configured to use dual distortion maps that reflect a stereo image off the combiner, allowing the left eye to receive a different image than the right eye, with vergence errors nulled out. The system includes an eye- or head-tracking sensor that enables the distortion maps to morph with the eye or head, continually nulling out vergence errors to produce a stable display. The system may be used for viewing stereo 2D images, non-stereo 2D images, and 3D images, with the images appearing flat to the viewer and focused at infinity.

FIG. 1 is a diagram of a system 100 for producing HUD images, in accordance with one or more embodiments of the disclosure. The system 100 may be incorporated into any environment requiring including but not limited to a vehicle, a workplace, or a gaming station. For example, the system 100 may be incorporated into an aircraft. In another example, the system 100 may be incorporated into a surgical station. In another example, the system 100 may be communicatively coupled to, or incorporated with, a flight management system 102.

In some embodiments, the system 100 includes a display 104 configured to transmit a display signal 106 (e.g., an image). The display 104 may be configured any type of display 104 including but not limited a liquid crystal display (LCD), emissive displays (e.g., an organic light emitting diode (OLED) display or a micro-LED display), a digital light processing (DLP) display, a liquid crystal of silicon (LCOS) display, a cathode ray tube display, a color display, or a monochrome display. The display 104 is configured to display imagery that enhances the visual information available to an operator 110. For example, the display 104 may deliver flight information from the flight management system 102.

In some embodiments, the system 100 further includes a combiner 108 configured to receive the display signal 106 from the display 104 and reflect the display signal 106 to the operator 110. The combiner 108 may be any type or kind of combiner 108 used in HUD systems. For example, the combiner 108 may be configured as a screen (e.g., a glass screen) combiner separate from any windshield comprising a partially reflective screen layer that reflects the display image into the line-of-sight of the operator 110. In another example, the combiner 108 may be configured as a windshield combiner 108 that is built into, or is part of, the windshield that partially reflect the display image into the line-of-sight of the operator. It is noted that the system 100 does not include a relay lens that distorts the display signal 106 as it is transmitted from the display 104 to the combiner 108, as is the case in traditional HUDs. Rather, the display 104 produces a distorted display signal that is compensated to the position of the head 114 or eyes 118 of the operator 110 that when reflected from the combiner 108, produces a non-distorted display signal that is readily seen by the operator 110 as a flat image that is focused at infinity (e.g., incoming rays of light that reach the eyes 118 of the operator 110 are functionally parallel), reducing blur.

Figure 2:
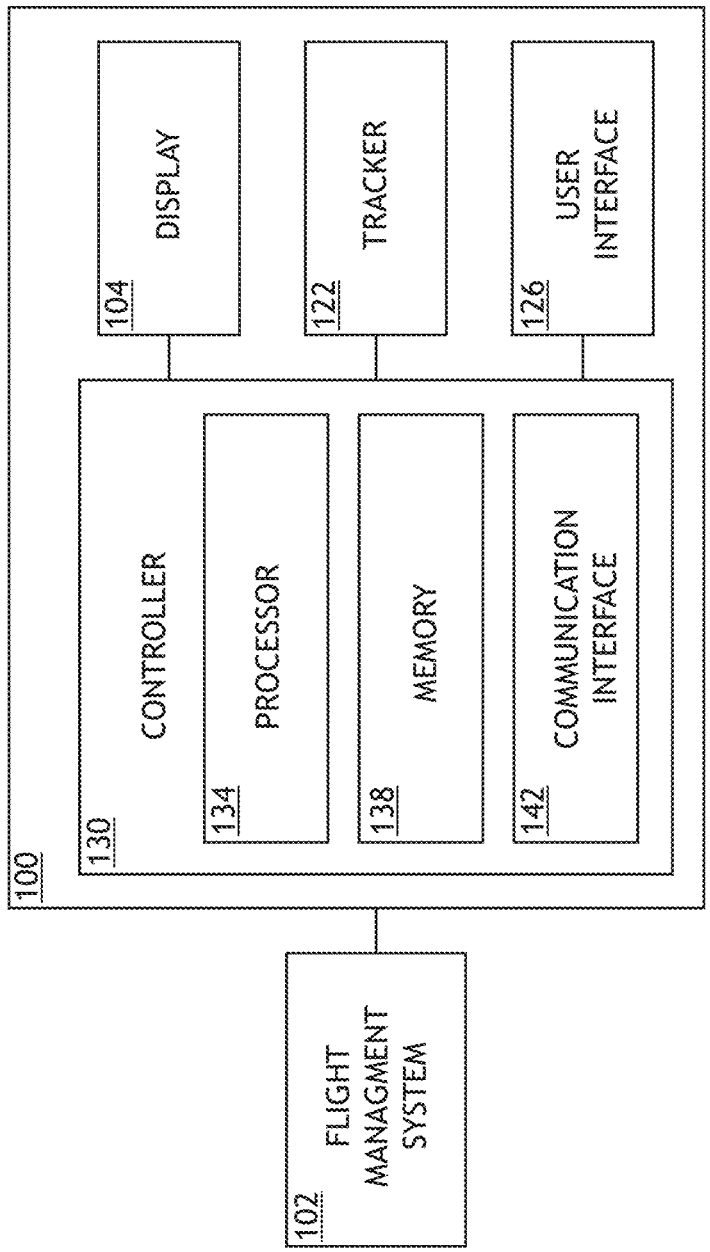
FIG. 2 is a block diagram of the electronic componentry of the system, in accordance with one or more embodiments of the disclosure.

FIG. 2 is a block diagram of the electronic componentry of the system 100, in accordance with one or more embodiments of the disclosure. In some embodiments, the system 100 further includes a tracking sensor 122 (e.g., head tracking sensor or an eye tracking sensor) configured to track the head 114, eye 118, or other aspect of the operator 110. The system 100 may use any type of biometric tracking technology including but not limited to optical (e.g., imaging) trackers, inertial trackers, LIDAR trackers, structural light imaging (e.g., Xbox or Kinecr) trackers, magnetic trackers, or a hybrid tracking user two or more tracking technologies. For example, the tracking sensor 122 may be configured as an optical tracker configured with a camera that monitors the face and/or eyes 118 of the operator 110. For instance, the optical tracker may use an infrared light system that illuminates the face of the operator 110, allowing an infrared-capable camera to monitor the operator 110 relative to a datum (e.g., center of screen). The tracking sensor 122 is configured to generate a tracking dataset (e.g., determine the X, Y, and Z positions of the eye and/or head), and transmit the tracking dataset to other componentry of the system 100.

In some embodiments, the system 100 further includes a user interface 126 configured to facilitate the interaction between the operator 110 and the system 100. The user interface 126 may be of any form or shape and include any type or number of interactive technologies including but not limited to a keyboard, a touch screen, a user display, a mobile device, or a control panel configured with switches and/or buttons. For example, the user interface 126 may include a control panel and a display that demonstrates on-screen the status of the system 100. In another example, the user interface 126 may be a mobile phone, wherein the status and/or control of the system is facilitated by an application executed on the mobile phone.

In some embodiments, the system 100 includes a controller 130 communicatively coupled to the display 104 and the tracker, and configured to perform the functionality described herein. The controller 130 may be configured within a singular housing, or may be configured as two, three, or more sub-controllers that are interconnected. For example, the display 104, the tracking sensor 122, and the user interface 126 may each be communicatively coupled to separate communicatively-linked sub-controllers. The controller may include one or more processors 134, memory 138, and a communication interface 142.

The one or more processors 134 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration.

The memory 138 can be an example of tangible, computer-readable storage medium that provides storage functionality to store various data and/or program code associated with operation of the controller 130 and/or other components of the system 100, such as software programs and/or code segments, or other data to instruct the controller and/or other components to perform the functionality described herein. Thus, the memory can store data, such as a program of instructions for operating the system 100 or other components. It should be noted that while a single memory 138 is described, a wide variety of types and combinations of memory 138 (e.g., tangible, non-transitory memory) can be employed. The memory can be integral with the controller, can comprise stand-alone memory, or can be a combination of both. Some examples of the memory 138 can include removable and non-removable memory components, such as a programmable logic device, random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 142 can be operatively configured to communicate with components of the controller 130 and other components of the system 100. For example, the communication interface 142 can be configured to retrieve data from the controller 130 or other components, transmit data for storage in the memory 138, retrieve data from storage in the memory 138, and so forth. The communication interface 142 can also be communicatively coupled with controller 130 and/or system elements to facilitate data transfer between system components.

Figure 3:
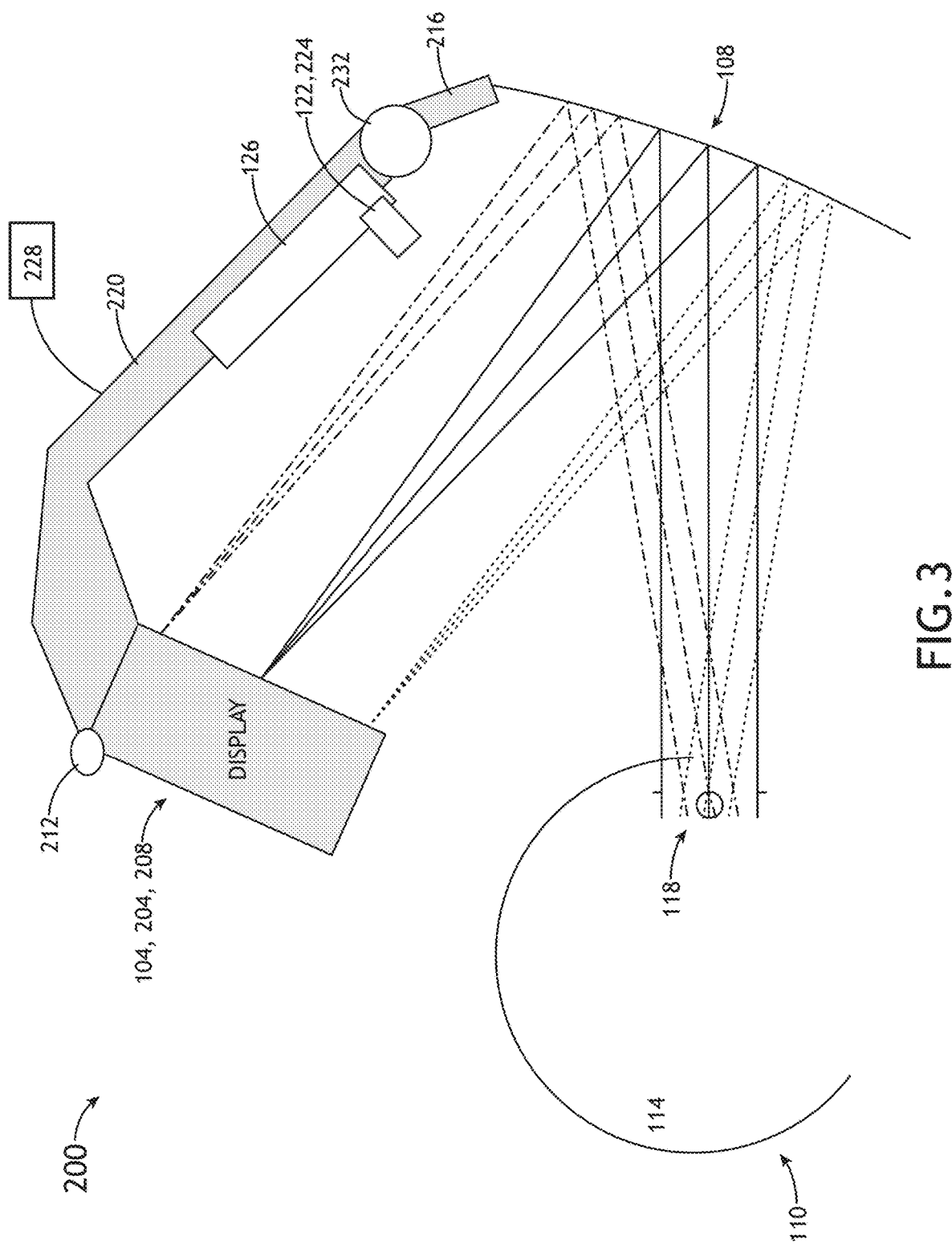
FIG. 3 is a drawing illustrating a side-view of a head-up-display system, in accordance with one of more embodiments of the disclosure.

FIG. 3 is a drawing illustrating a side-view of a system 200, in accordance with one or more embodiments of the disclosure. System 200 may include one or more, or all, components of system 100, and vice versa. System 200 may include one or more structural and electronic components that facilitate the interplay between the display 104, the combiner 108, the tracking sensor 122, and or the user interface 126. For example, the display 104 may include a protective display enclosure 204 coupled to a display frame 208 via an adjustment pivot 212. The display frame 208 may be further coupled to a combiner frame 216 via coupling member 220. Any shape, number, or over design of the structural coupling components of the system 200 are possible. Therefore, the above description should not be interpreted as a limitation of the present disclosure, but as an illustration.

The system 200 may further include a tracker mount 224 configured to couple one or more components of the tracking sensor 122. For example, the tracker mount 224 may be configured to couple a camera for an optical tracker system. The system 200 may further include a power supply 228 configured to deliver power to the display and/or the tracking sensor 122. The power supply 228 may be a stand-alone module or as a plug-in or wired-in power component. For example, the system 200 may be wired-in or plugged into the power supply 228 (e.g., electrical system) of an aircraft. In some embodiments of the system 200, the coupling member 220 may be physically coupled to the user interface 126 configured as a control panel. The coupling member 220 or other component of the system 200 may include a hinge 232 that allows the display 104 to be placed in a stowed position when not in use, allowing greater head clearance for the operator 110.

In embodiments, the system 100 is configured to deliver a stereoscopic image to the operator 110, wherein specific images are delivered to each eye 118 of the operator 110, resulting in a stereo binocular image. The resulting image may increase one or more qualities of the image to the operator 110, such as an enhanced virtual depth of the image. For example, the system 100 the system may deliver a stereoscopic image that the operator 110 can view without the use of special eyewear or other optical devices (e.g., freeviewing). For instance, the system 100 may utilize a parallel freeviewing method that uses an image pair, with the left-eye image displayed on the left, and the right-eye image displayed on the right. In another instance, the system 100 may utilize a cross-eyed viewing method that swaps the left-eye image and the right-eye image so that they will be correctly be seen cross-eyed (e.g., the left eye 118 viewing the image on the right, and vice versa). Prismatic, self-masking glasses may also be used in the cross-eyed viewing method, which reduces the degree of convergence required, allowing large images to be displayed.

Figure 4:
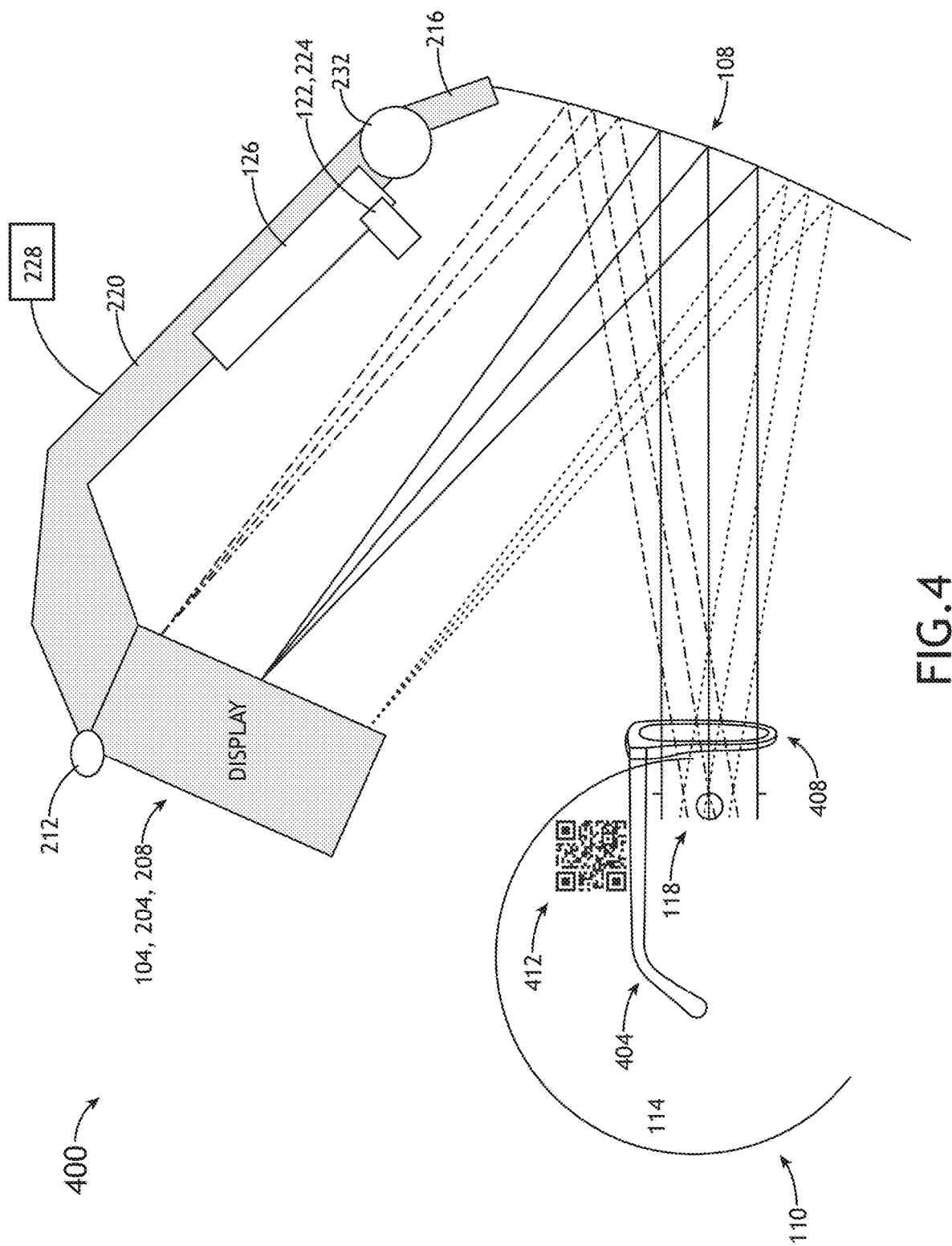
FIG. 4 is a drawing illustrating a side-view of a head-up-display system that includes eyewear, in accordance with one or more embodiments of the disclosure.

FIG. 4 is a drawing illustrating a side-view of a system 400, in accordance with one of more embodiments of the disclosure. System 400 may include one or more, or all, components of system 100 and 200 and vice versa. In embodiments, system 400 may include eyewear 404 that is recognizable by the system 400 and includes at least one lens 408. For example, the eyewear 404 may include an embedded target (e.g., a fiducial) that can be tracked by the tracking sensor 122. The position of the operator's eyes 118 relative to the embedded target on the eyewear 404 can be measured, and the respective measurements can be used to create a tracking profile that is specific for the set of eyewear 404 and the eyes 118 of the operator 110 (e.g., the eyewear is assigned a tracking profile that is used to generate the tracking dataset) Different operators 110 may have different eye measurements resulting in different tracking profiles. A barcode 412 or other identifying marker may be used to keep track of the user and/or eyewear used by the system 400. For example, the system 400 may initially create a first tracking profile for an eyewear 404/operator 110 by determining the eye position of a first operator 110 relative to the eyewear 404 (e.g., with each operator 110 receiving their own specific eyewear 404 with a specific barcode 412). During flight, the system 400 may recognize the first operator 110 via the barcode 412 on the eyewear 404 and operate via the first tracking profile. In a similar manner, the system 400 may generate a second tracking profile for a second operator 110 utilizing eyewear 404 with a second barcode 412, which is used during flight to track the eye position of the second operator 110. In some embodiments, the eyewear 404 does not include the barcode 412 and the tracking profile is identified by the system 400 using a different method (e.g., by manually entering a code). The system 400 can then generate the tracking dataset by taking real time position measurements of the eyewear, and converting those measurements based on the tracking profile.

In some embodiments, the system 400 the system utilizes eyewear 404 or lenses 408 with special qualities. For example, the system 400 may utilize eyewear 404 or viewers that assist the operator in maintaining a parallel line of sight between the left eye and right eye (e.g., similar to a stereoscope). In another example, the system 400 may utilize active shutter eyewear that openly present the image intended for the left eye while blocking the right eye's view, then presenting the right-eye image while blocking the left eye (e.g., temporal isolation). In another example the system 400 may utilize passive spectacle technologies (e.g., polarization lenses, interference filters, color anaglyphs, chromadepth technologies, Pulfrichn technology, and/or over/under format technology) that allow viewing of different images by each eye to produce stereoscopic vision. Any technology that facilitates the view of stereoscopic images from the combiner 108 may be utilized. Therefore, the above description should not be interpreted as a limitation of the present disclosure, but as an illustration.

In embodiments, the system 100 delivers a display signal 106 from the display 104 to the combiner 108 without the use of a relay lens. In traditional HUD technology, the relay lens, along with the combiner 108, produces for each pixel from the display 104 a beam of parallel rays that illuminates a volume in space, referred to as an eyebox. When the eyes 118 of the operator 110 are located within the eyebox, the display signal 106 is visible to the operator 110, is sharply focused, and appears to be far away (e.g., appearing to extend beyond the combiner). The relay lens specifically modifies the display signal 106 to create a pre-aberrated image or intermediate image, at the focal point of the collimating combiner 108. The combiner 108 then reflects light from the focal point beams of parallel rays unique to each pixel, which illuminates the eyebox. Removal of the relay lens from a traditional HUD system greatly reduces the eyebox, forcing the operator to remain relatively motionless at a specific position in order to see a correct display signal.

By incorporating a tracking sensor 122, and a display 104 that can modify the display signal 106 based upon information from the tracking sensor 122, the display signal 106 adjusts to the position of the operator 110 greatly increasing the ability of the operator to access the display signal 106 within the eyebox and view a correct display signal 106. For example, the system 100 may be configured to generate a display signal 106 that is fixed relative to the operator 110 by pre-distorting the display signal according to where the eyes 118 are placed. The tracking sensor 122 may include a small CMOS camera located on the combiner frame 216 or coupling member 220 configured to take a digital photograph of the pilot's face, along with an infrared light emitting diode (LED) that illuminates the pilot's face. The resulting facial image is then processed via the one or more processors 134 to detect the location of the eyes 118, and the location data is used to generate a tracking dataset of the eyes. It is noted that eye tracking sensors typically initiate by tracking the head 114 of the operator 110, then the eyes 118 are located based on head location.

The tracking dataset may include any data or dataset generated from the tracker 112 that is used within the system 100 to determine the position of one or more aspects of the head 114 of the operator 110. The tracking dataset may include one or more of an eye position of the operator 110, a position of both eyes 118 of the operator 110 (e.g., a pair of eye positions), a head position, a gaze position (e.g., based on the position of the pupils of the operator 110), an operator pose, or any other aspect based on the position of the head 114 of the operator 110. The tracking dataset may also include any combination of the positions of two or more aspects of the head of the operator including but not limited to a combination of eye position and gave position, a combination of eye position and head 114 position, a combination of gaze and head position, a combination of gaze and eye position (e.g., a pair of eye positions), and a combination of eye position, head position, and gaze positions.

The tracking datasets described herein track the positions of the aspects of the operator 110 relative to one or more components of the system 100. For example, the tracking datasets may track the position of the pair of eyes 118 of the operator 110 relative to the display 104, the combiner 108, the tracking sensor 122, and/or other componentry). The tracking dataset may also track the position of the aspects of the operator 110 relative to one or more components of an aircraft or an aircraft cockpit. For example, the tracking dataset may track the position of the pair of eyes 119 of the operator 110 relative to a fiducial located within the cockpit.

Once the tracking dataset is generated, the one or more processors can generate a distortion map based on the tracking dataset. The distortion map may be generated through any type of image distortion method. For example, the distortion map may be generated using a polynomial-based distortion function in which the coefficients track with the head position. In this manner, the system 100 can generate discrete distortion maps for discrete eye positions in the eyebox. The distortion functions change smoothly between points, so that is possible to either interpolate between each point, or fit functions to the polynomial coefficients, creating a distortion map that continuously updates with head or eye position (e.g., each unique eye position utilizing a unique distortion map to produce a correct image).

In some embodiments, the distortion maps are generated using optical raytracing to create maps from different eye positions through-out the eyebox. Any number of maps may be created. For example, approximately 50 maps may be created. In another example, approximately 500 maps may be created. The raytrace code used to create the distortion maps may be obtained from any commercial or noncommercial source, for example, the Optics Software for Layout and Optimization (OSLO) software package vended by the Lambda Research Corporation.

A sampling of the eyebox may be lateral from negative five to positive five inches and vertical +3 to −3 inches, using half-inch increments (e.g., if the system 100 is bilaterally symmetric, the negative lateral side of the eyebox may be ignored). A distortion map may be derived from a dataset containing a set of values representing the azimuth (Az) and elevation (El) (e.g., where El/Az is represented as field angles in degrees), and a set of values representing X and Y (e.g., where X/Y are positions on the display in inches, millimeters, or pixel column/row that respond to each field angle. a representative dataset 500 shown in FIG. 5A, in accordance with one or more embodiments of the disclosure.

Once the dataset 500 is derived, data within the dataset 500 is used via polynomial script to automate polynomial fits. For example, the polynomial script may be used to generate 6th order fits, wherein the polynomial coefficient (C) format is '$(C_{nm})*(X^N)*(Y^M)$', wherein $C_{nm}=C(N+1,M+1)$, $C_x$ is an X polynomial coefficient, and $C_y$ is a Y polynomial coefficient. The coefficients of each polynomial are collected and organized according to their order so that they might be evaluated as a function of position in the eyebox. This output produces arrayed data that is then further used to create polynomial fits in X and Y to each coefficient map in the eyebox plane. The calculations for creating polynomial fits may be performed using one of many available software packages or computing environment including but not limited to the MATLAB™ environment developed by the Mathworks company.

The coefficients used for the distortion map polynomial can be described for the polynomials themselves. For example, a facial feature detection system that can produce the X/Y positions of each eye can simply input the X and Y values into a polynomial corresponding to 14 coefficients. A listing of the coefficient polynomials then follows. In some cases, the coefficients of these polynomials become vanishingly small past the 3rd order ($<<10^{-12}$). This is not unexpected, because the image does not bend chaotically, rather the image often gently warps in a manner consistent with 2nd order coefficients. It might therefore be possible to eliminate coefficients at order 3 and higher, and certainly 4th and higher. However, the base distortion polynomial may still have a 6th order format, with only the 0-, 1-, and 2-order coefficients necessitating a change with head position. Other strategies for developing a distortion map are possible. Therefore, the above description should not be interpreted as a limitation of the present disclosure, but as an illustration.

Once the distortion map is generated, a media stereo image signal, such as a signal for aircraft symbology to be displayed on the display 104, can then be received by the system 100 and modified by the distortion map to produce a corresponding pre-distorted stereo display signal 106 displayed by the display as a pre-distorted media stereo image that is reflected off the combiner 108 and received by the operator 110 as a corrected media stereo image. For example, before a digitized stereo media image is displayed on the display 104, the position of each pixel within the stereo media image is modified based on each corresponding pixel point of the distortion map. After the pixel position is modified, and the stereo media image is displayed and reflected off of the combiner 108, the distortion of the pre-distorted image caused by reflection off the combiner 108 produces a corrected image, and the operator 110 will view the pixel in the correct position. This ability of the system 100 to generate a pre-distorted media stereo image in the display 104 replaces the need for a relay lens. For example, in traditional head up display systems, the relay lens was required to transform an original image (e.g., without pre-distortion) from the display 104 into a distorted image that, once reflected from the combiner 108, produced a corrected media image that was nearly identical to the image displayed by the display 104. Therefore, pre-distorting the digital stereo media image before the image is displayed by the display 104 via correlation to the distortion map, which is in turn determined by the position of the operator 110 via the tracking sensor 122, performs the same task as performed by the relay lens, The results of distortion mapping is shown in FIGS. 5B-C (e.g., mapping images 504, 508), in accordance with one or more embodiments of the disclosure.

Figure 5B:
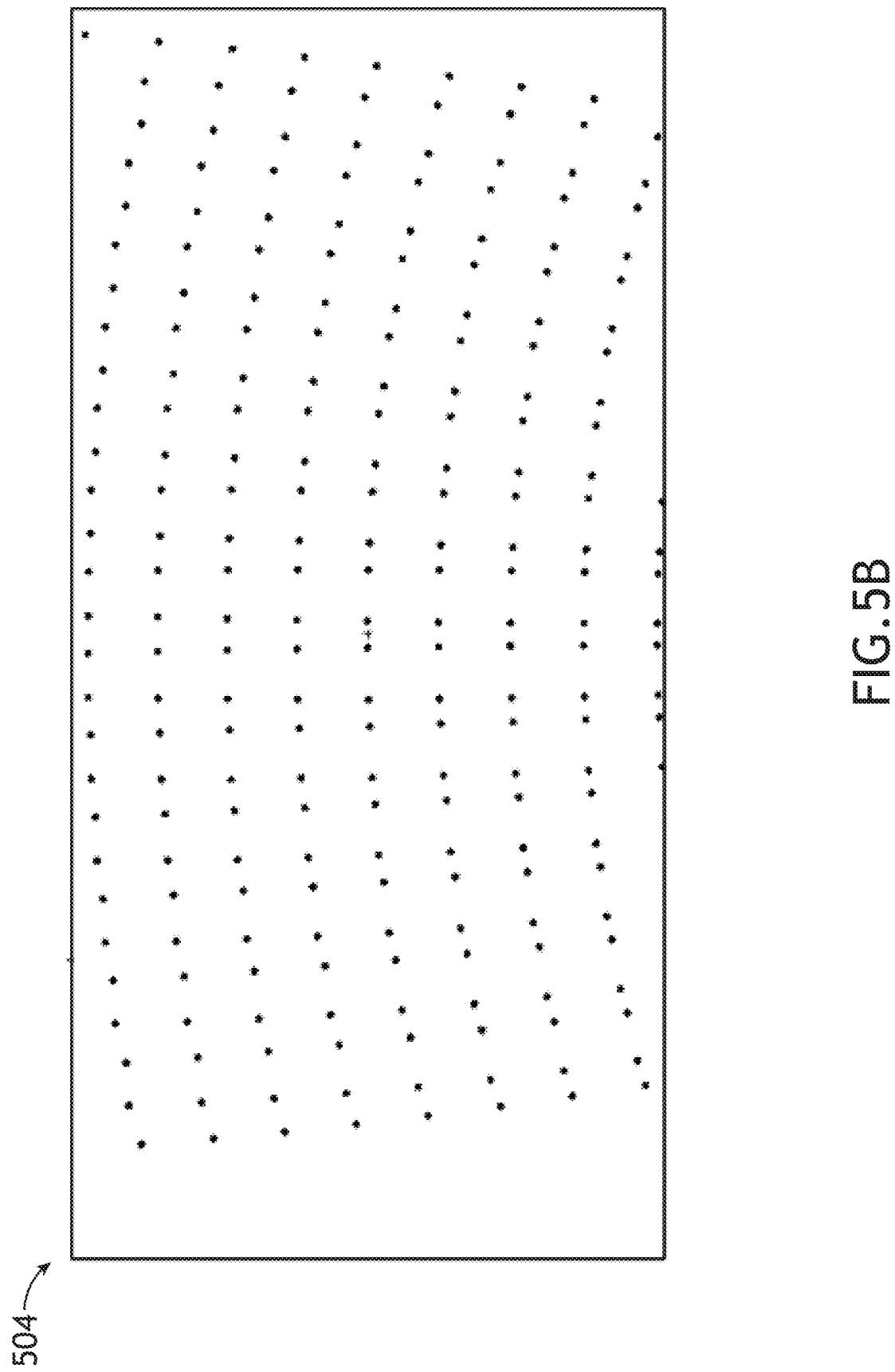
FIGS. 5B-C are drawings of distortion map images, in accordance with one or more embodiments of the disclosure.
Figure 5C:
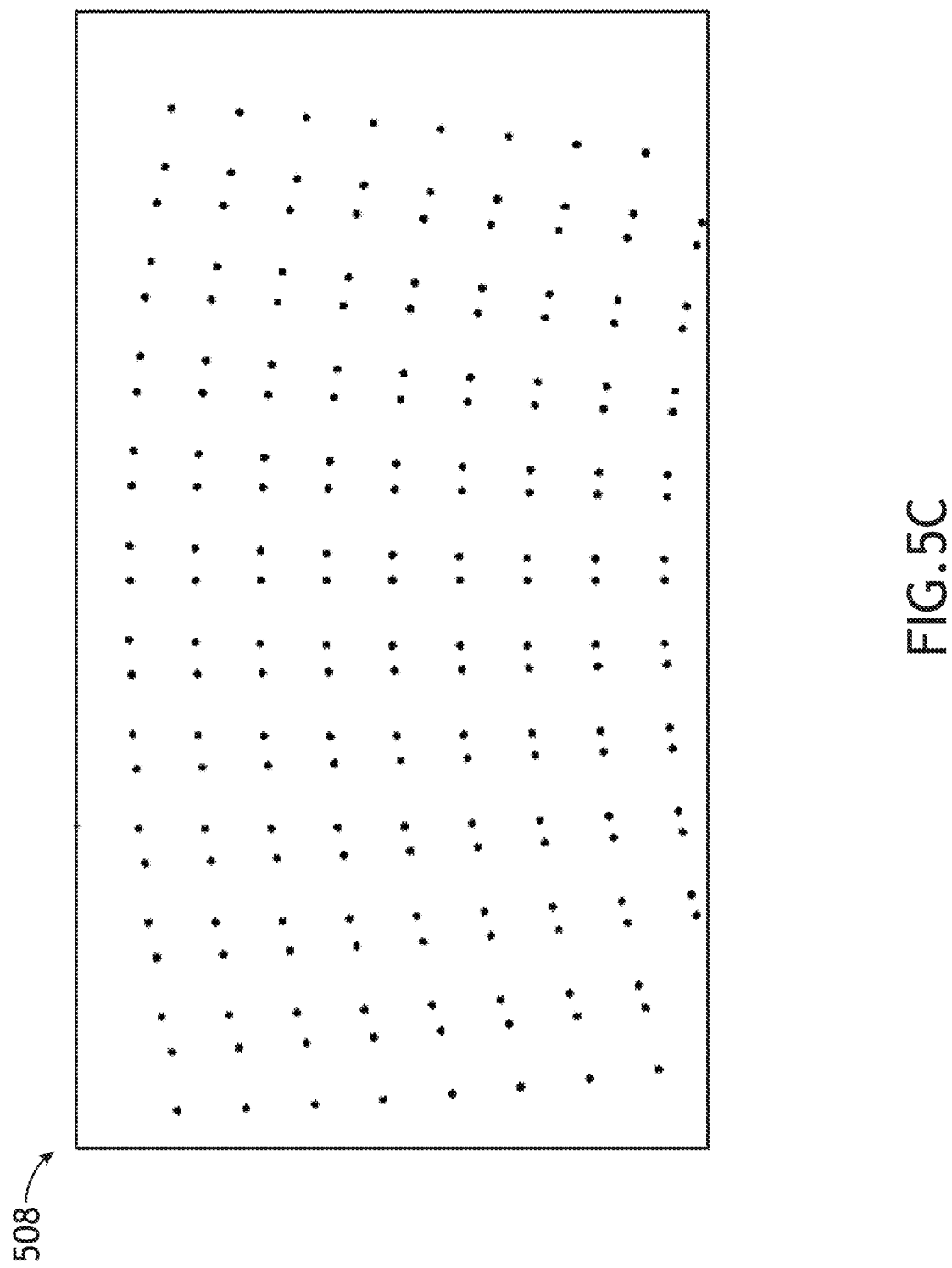

In FIG. 5B, the distortion map image 504 demonstrates two overlaid arrays of dots (e.g., one array specific for each eye) that, when reflected off the combiner 108 (e.g., a curved combiner) and viewed by an operator 110 at a centered position, appears to the operator 110 as a single square array of equidistant dots. Therefore, and as detailed above, instead of a relay lens pre-distorting a correct image from the display 104 that is then distorted by the combiner 108 to form a correct image viewed by the operator, the display 104 itself is producing the pre-distorted image (e.g., through the polynomial-based distortion function. FIG. 5C, demonstrates a similar distortion map image 508 for an operator that has moved 1.25 inches from center. In this distortion map image 508, a different pattern of dots appears that as shown in FIG. 5B, confirming that different positions of the operator 110 require and use different distortion maps. In some embodiments, the system 100 produces a stereo signal that is reflected off the combiner as parallel beams, allowing the operator 110 to keep the stereo image in focus at any distance from the combiner within the cockpit or pilot seat within the field of view.

In some embodiments, the HUD is configured as a glareshield mounted HUD. For example, the combiner 108 may be mounted to the glareshield and disposed adjacent and approximately parallel to, or incorporated within, the windshield. The glareshield mounted HUD may be configured with the display 104 located behind or below the combiner 108. An optical arrangement 600 of a system 100 configured with the display 104 disposed below the combiner 108 (e.g., projecting from, behind, or below the glareshield) is shown in FIG. 6, in accordance with one or more embodiments of the disclosure.

In some embodiments, the system 100 and/or optical arrangement 600 includes one or more fold mirrors 604. For example, for a glareshield mounted HUD, a fold mirror may be configured to reflect the image from the display 104 onto the combiner. For instance, the display image may be pre-distorted so that reflection by the fold mirror 604 and the combiner 108 produces a correct image. The one or more fold mirrors 604 may also improve upon one or more characteristics of the system. For example, the one or more fold mirrors 604 may facilitate an increase the field of view of the system 100.

In some embodiments, one of more of components of the system (e.g., the display 104, the combiner, 108, and/or the one or more fold mirrors 604) is actuatable, steerable and/or rotatable, Actuation of these elements may improve upon one or more characteristics of the system 100, including increasing the field of view. Actuation of one or more components of the system 100 may then be correlated to the distortion map, with the display image pre-distorted to form a correct image based on the position of the one or more components.

Figure 7A:
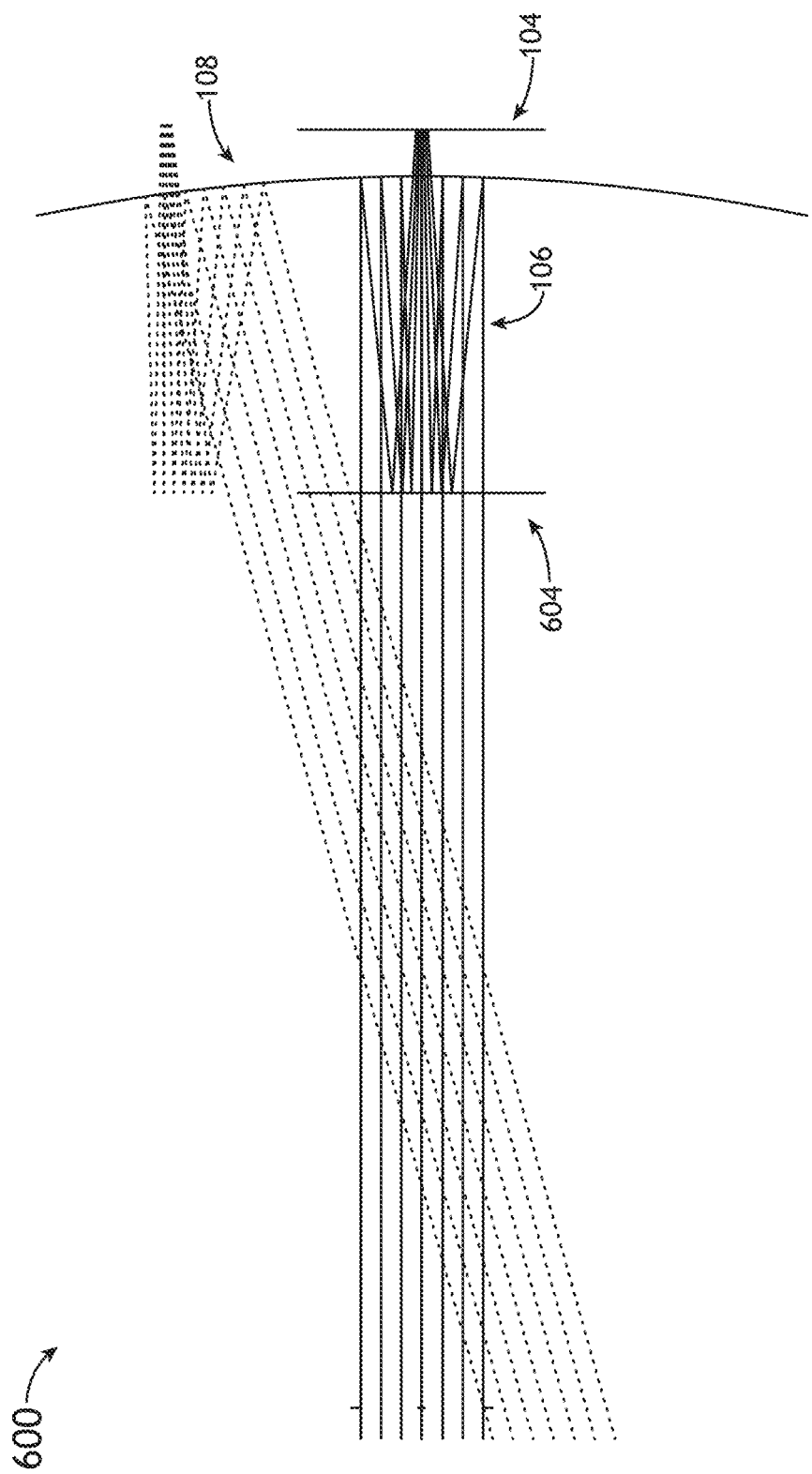
FIGS. 7A-B are drawings illustrating a plan view of an optical arrangement, in accordance with one or more embodiments of the disclosure.
Figure 7B:
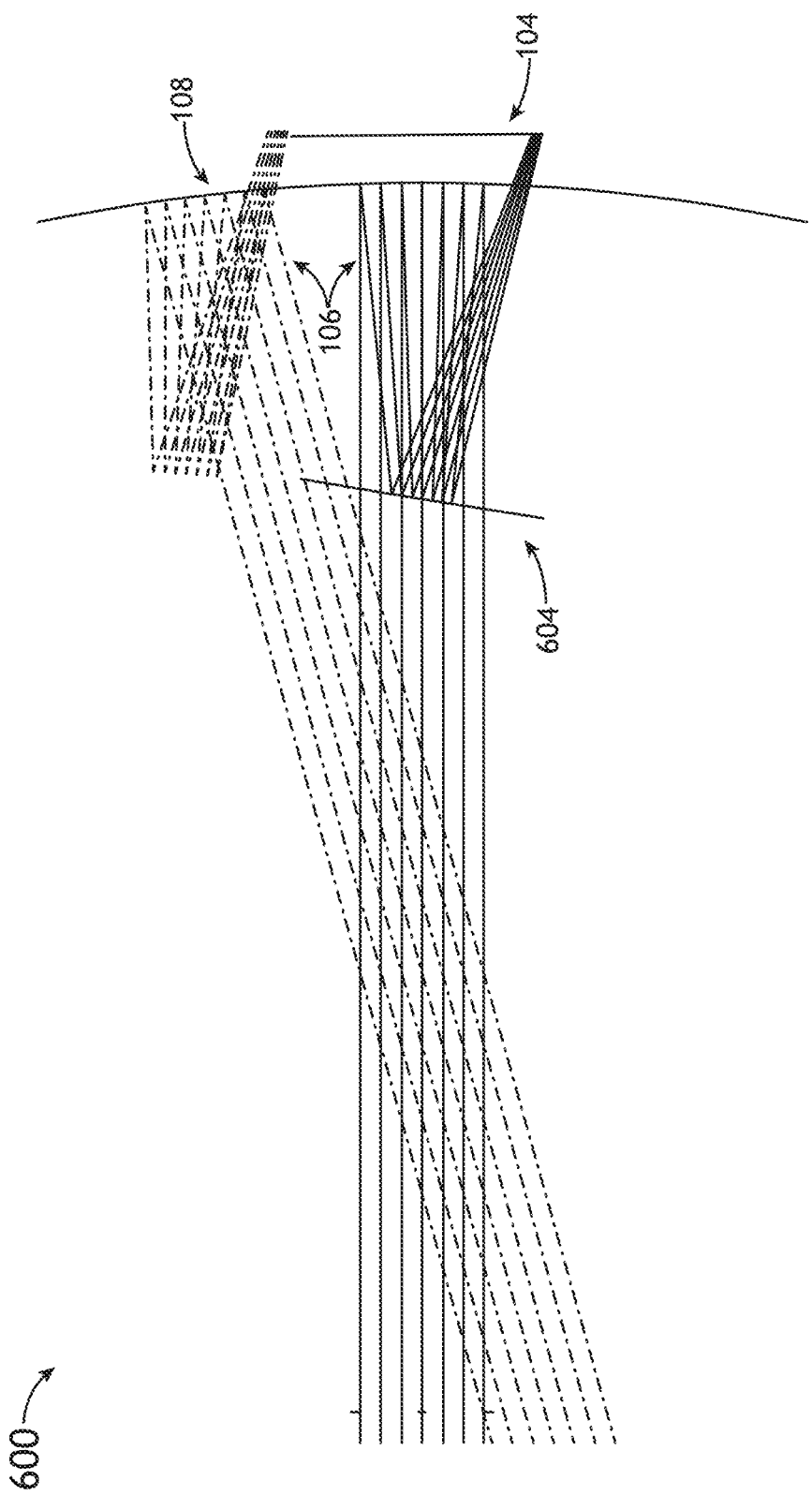

FIG. 7A-B are plan-view drawings of the optical arrangement 600 configured with a rotatable fold mirror 604, in accordance with one or more embodiments of the disclosure. FIG. 7A shows the optical arrangement 600 with the rotatable fold mirror 604 set at a default zero degrees tilt. In this configuration, the display signal 106 from the display 104 is reflected by the fold mirror 604 to the combiner 108, which is reflected again to the operator with a relatively narrow field of view. As shown in FIG. 7B, upon a 10-degree tilt, field angles not previously visible can now come into view upon later at head motion by the operator 110.

Figure 8:
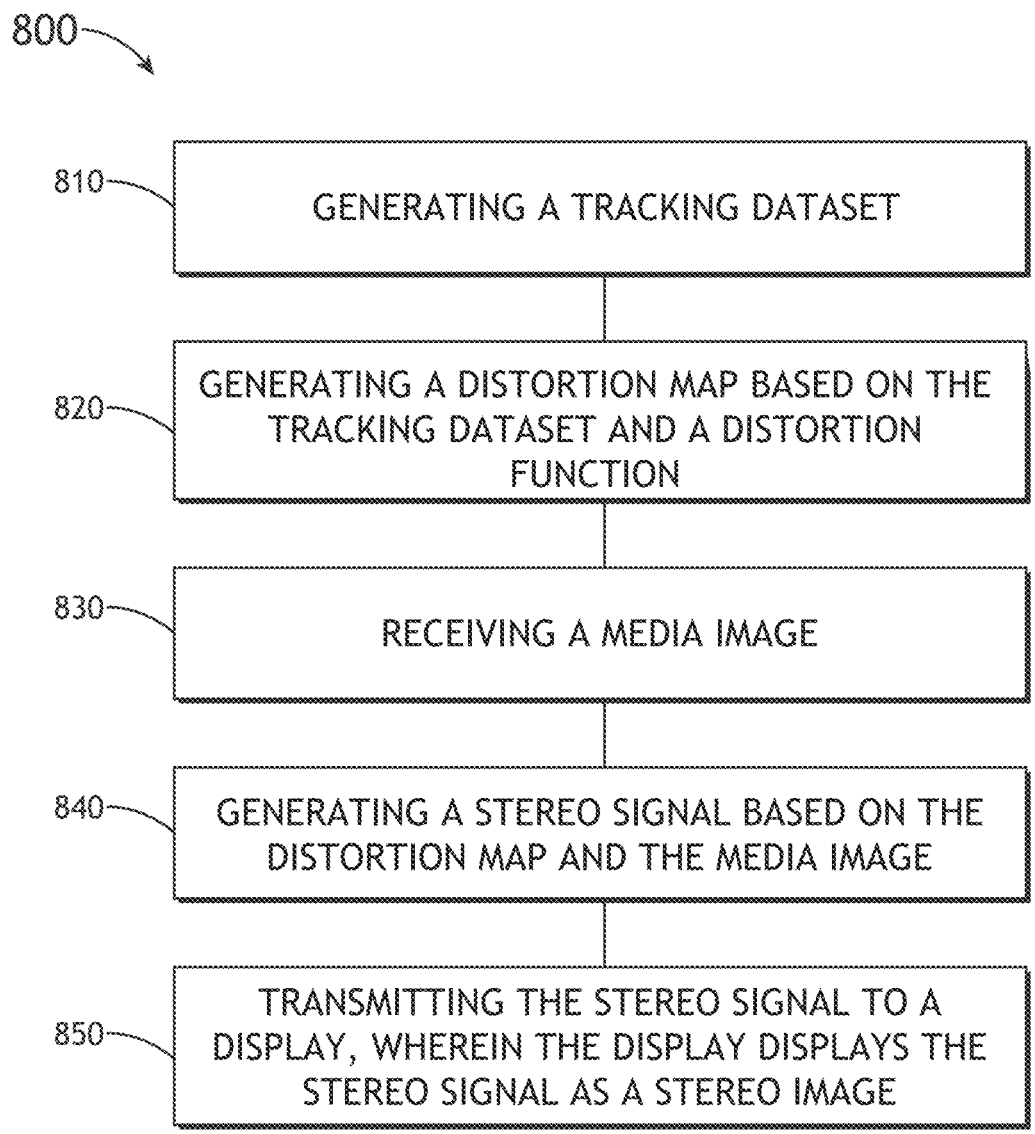
FIG. 8 is a flow diagram illustrating a method for displaying a stereo image in a HUD, in accordance with one or more embodiments of the disclosure.

FIG. 8 is a flow diagram illustrating a method 800 for displaying a stereo image in a HUD, in accordance with one or more embodiments of the disclosure. The method 800 requires the coordination of the display 104, the combiner 108, and the tracking sensor 122 under the control of the controller 130.

In some embodiments, the method 800 includes a step 810 of generating a tracking dataset. For example, the tracking sensor 122 may generate the tracking dataset (e.g., an image of the operator 110 in a cockpit), and transmit this information to the one or more processors 134. In some instances, the resources used to generate the tracking dataset may be shared between the tracking sensor 122 and the one or more processors 134.

In some embodiments, the method 800 further includes a step 820 of generating a distortion map based on the tracking dataset and a distortion function. As described herein, distortion functions are created in which track with the head 114 or eye 118 position, with many distortion functions created for the many positions of the operator's head 114 and/or eye.

In some embodiments, the 800 includes a step 830 of receiving a media image. For example, the system 100 may receive navigation symbology from the flight management system 102 that will be eventually projected by the display 104. The image may be a single image or a stereo image pair.

In some embodiments, the method 800 further includes a step 840 of generating a stereo signal based on the distortion map and the media stereo image. For example, the media image may be a non-distorted or correct image file that is transmitted to the system 100 from an outside source, such as the flight management system 102, or other computer system or network. Once received by the system 100, the one or more processors 134 then distorts the media image as determined by the distortion map, producing a distorted stereo signal or display signal 106 that when reflected off of the combiner 108 produces a correct image as seen by the operator 110.

In one or more embodiments, the method 800 further includes a step 850 of transmitting the stereo signal to the display 104, wherein the display 104 displays the stereo signal as a stereo image. The display 104 may be of any type as described herein and should be fast enough to refresh in accordance with latency requirements for cohesive head tracking. The display 104 then presents the stereo signal as the display signal 106.

The systems 100, 200 and method 800 described herein may be configured for a variety of used. For example, the systems 100, 200 may be configured for simulator displays, aerial refueling displays, windowless cockpits, ground vehicle displays (e.g., windowless ground vehicle displays, automotive HUDs, and ultra-wide field applications (e.g., immersive applications) with tiled fields of view.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
   a stereoscopic head up display (HUD) comprising:
     a combiner; and
     a display configured to display a stereo media image, the stereo image being reflected off the combiner and received by an operator;
   a tracking sensor configured to generate and transmit a tracking dataset;
   one or more processors communicatively coupled to the display and the tracking sensor; and
   a memory communicatively coupled to the one or more processors with instructions stored thereon, wherein the instructions, upon execution by the one or more processors, causes the one or more processors to:
     receive the tracking dataset;
     generate a set of distortion maps based on the tracking dataset and a distortion function;
     receive a media stereo image signal;
     generate a pre-distorted stereo image signal based on the set of distortion maps and the media stereo image signal, wherein a position of a pixel of the media stereo image signal is modified based on a corresponding pixel point of the distortion map; and
     transmit the pre-distorted stereo signal to the display, wherein the pre-distorted stereo signal is displayed as a pre-distorted stereo media image, wherein upon reflection off the combiner, the pre-distorted stereo media image is corrected, and received by the operator as a flat image focused at infinity,
wherein the tracking dataset comprises a pair of eye positions.

2. The system of claim 1, wherein the distortion map is generated via a polynomial fitting.

3. The system of claim 1, further comprising eyewear recognizable by the tracking sensor, wherein the eyewear is assigned a tracking profile that is used to generate the tracking dataset.

4. The system of claim 1, further comprising eyewear configured to facilitate stereoscopic viewing.

5. The system of claim 1, wherein the display is configured as a liquid crystal display.

6. The system of claim 1, wherein the system does not include a relay lens.

7. The system of claim 6, further comprising a coupling frame configured to mechanically couple the display to the combiner.

8. The system of claim 1, wherein the display is configured as an emissive display.

9. The system of claim 1, further comprising a user interface communicatively coupled to the one or more processors.

10. The system of claim 1, wherein the HUD is configured as a glareshield mounted HUD.

11. The system of claim 1, further comprising one or more fold mirrors configured to increase a field of view.

12. A method for displaying a stereo image comprising:
generating a tracking dataset;
generating a set of distortion maps based on the tracking dataset and a distortion function;
receiving a media stereo image;
generating a stereo signal based on the distortion maps and the stereo media image; and
transmitting the stereo signal to a display of a stereoscopic head up display (HUD), wherein the display displays the stereo signal as a stereo image,
wherein generating the tracking dataset includes sensing a position of the eyes of an operator.

13. The method of claim 12, wherein the distortion map is generated via a polynomial fitting.

* * * * *